(No Model.)

J. B. UPHAM.
MAGIC LANTERN AND WONDER CAMERA COMBINED.

No. 298,636. Patented May 13, 1884.

Witnesses

L. D. Benner

Richd A. Goldsbrough

Inventor,

James B. Upham;

per A. B. Upham,

His Attorney.

UNITED STATES PATENT OFFICE.

JAMES B. UPHAM, OF BOSTON, MASSACHUSETTS.

MAGIC LANTERN AND WONDER CAMERA COMBINED.

SPECIFICATION forming part of Letters Patent No. 298,636, dated May 13, 1884.

Application filed February 2, 1884. (No model.)

*To all whom it may concern:*

Be it known that I, JAMES B. UPHAM, of Boston, in the county of Suffolk, in the State of Massachusetts, have invented a Combined Magic Lantern and Wonder Camera; and I do hereby declare that the following is a full, clear, and exact description thereof, reference being had to the annexed drawings, making a part of this specification, in which like letters of reference refer to like parts, and in which—

Figure 1:
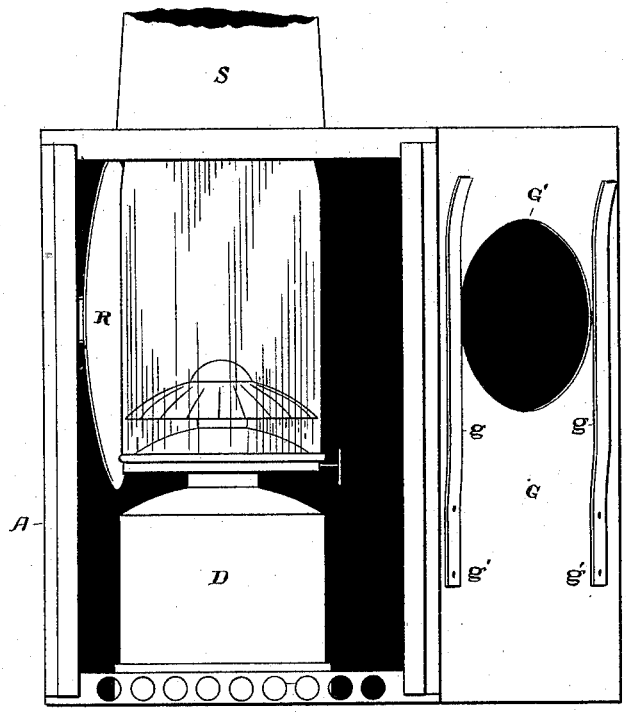
Figure 2:
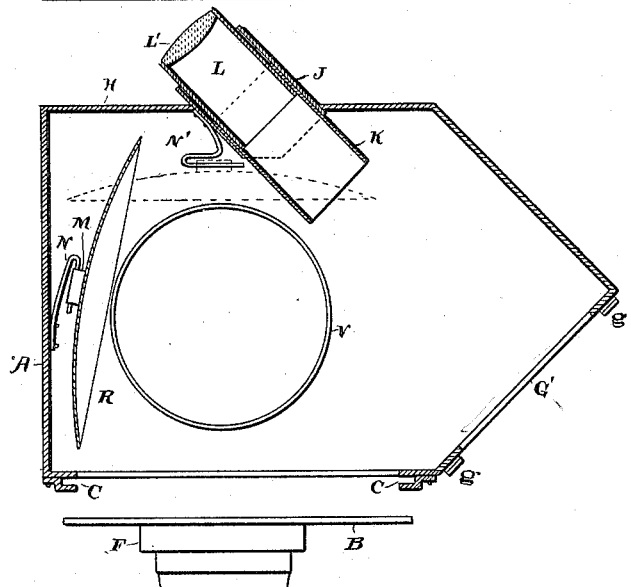

Figure 1 represents a side elevation of the same; Fig. 2, a horizontal section at *x x*.

The object of this invention is the construction of an optical instrument in a simple and inexpensive form, by means of which an image of either a transparent or opaque picture may be enlarged and cast upon a screen.

The following is my construction:

A is a box of sheet metal, wood, or other suitable material, which is, as shown in Fig. 2, pentagonal in plan, having three right angles and two angles of one hundred and thirty-five degrees each, approximately. The side B of this box A is made removable by sliding vertically in the channels C, and serves as a door through which to insert, remove, or adjust the lamp D. In this door B is an aperture at the level of the flame of said lamp, and in front of the same is the projecting tube E, containing lenses and transverse slot for the insertion of transparent picture slides, as in other magic lanterns. In the side G of the box A is an opening of a circular or other form, the center of which is approximately on a level with the lamp's flame. The springs *g*, fastened at their ends *g'* to the side G—one at each side of the said opening G'—are for the purpose of holding in front of the same any opaque picture, as photographs, engravings, or cards with natural objects secured thereon.

Angularly through the side H of the box A is rigidly fastened a cylinder, J, the axial center of which is coincident with a perpendicular to the center of the opening G'. Within said cylinder J is another cylinder, K, just enough smaller to be removably friction-tight therein. In this latter cylinder is the lens-containing tube L.

To prevent the entrance of light directly from the lamp D into the tube L, the cylinder K is impressed to the inner end of the cylinder J, as shown in Fig. 2. The light from the lamp D is reflected from the face of the picture or object held by the springs *g* at the opening G', and out through the lens-tube L directly in front thereof. By means of the lens L' the light-rays from said picture or object are thrown as an enlarged image of the same upon a screen or other blank surface. The object in shutting off the direct light from the lamp by means of the cylinder K is that the reflected rays from the picture or object may not be interfered with, and the image rendered thereby less distinct. The concave mirror or reflector R throws upon the picture at the opening G' the light shining from the lamp at the rear thereof. This reflector R is held in position by means of the broad eye M, fastened thereto, and the hook N, secured to the side of the box A.

In using this lantern for throwing transparent pictures upon a screen, the lens-tube L is removed from the cylinder K and inserted in the projecting tube E, and a card put behind the springs *g* to close the opening G'. The reflector R is then removed from the hook N and replaced upon the hook N', the cylinder K being slid back out of the way to make room for the same. This is the reason I make the two cylinders J K telescope, the one into the other, instead of having a single long tube.

The chimney S, I make removable from the box A, to allow of compactness in packing.

The ring V, soldered or otherwise secured to the bottom of the box A, is for the purpose of receiving the base of the lamp D, and thereby locating the same in the right place and retaining it there.

What I claim as my invention, and for which I desire Letters Patent, is as follows, to wit:

1. In a combined magic lantern and wonder camera, a box having projecting tube E and aperture G', provided with means for retaining opaque pictures thereat, in combination with the cylinder J, having lens-tube L therein, a lamp, D, and a concave mirror, R, having means whereby it may be shifted in position to reflect the lamp-light upon a picture held at said opening G' or to the said projecting tube E, substantially as described.

2. The pentagonal box A, having opening G', and means for holding pictures thereat, in combination with the cylinder J, lens-tube L, hooks N N', concave mirror R, having eye M, and the lamp D, substantially as and for the purpose specified.

3. The box A, having opening G', springs $g$, and ring V, in combination with the cylinder J, cylinder K, lens-tube L, and concave mirror R, substantially as and for the purpose set forth.

4. The box A, having opening G', springs $g$, cylinder J, cylinder K, lens-tube L, and hooks N N', in combination with the mirror, having eye M, ring V, lamp D, side B, removable in the channels C, and having projecting tube E, as shown and described.

In testimony that I claim the foregoing invention I have hereunto set my hand and seal this 21st day of January, 1884.

JAMES B. UPHAM. [L. S.]

Witnesses:
 JOHN H. HARDY,
 SAMUEL S. ELDER.